Feb. 12, 1946.   R. H. GODDARD   2,394,853
LIQUID STORAGE TANK
Filed Oct. 24, 1941

Inventor
Robert H Goddard
By attorney

Patented Feb. 12, 1946

2,394,853

UNITED STATES PATENT OFFICE 2,394,853

LIQUID STORAGE TANK

Robert H. Goddard, Roswell, N. Mex., assignor of one-half to The Daniel and Florence Guggenheim Foundation, New York, N. Y., a corporation of New York Application October 24, 1941, Serial No. 416,331

15 Claims. (Cl. 137—21)

This invention relates to tanks in which liquids are stored and from which said liquids are delivered, usually at atmospheric pressure. When such tanks are subject to angular displacement or to changes in acceleration, as in an aircraft, it has been found difficult to maintain continuous liquid discharge therefrom, as the discharge outlet of such a tank may be partly or wholly uncovered from time to time, or the depth of liquid above the outlet may vary widely.

It is the general object of my invention to provide a construction in a liquid storage tank which will effect continuous liquid discharge from the tank in any angular position of the tank or under substantial changes in acceleration or deceleration.

To the attainment of this general object, I provide a plurality of separate discharge valves, together with means for opening each valve when submerged and when in a definite relation to the mass of liquid in the tank.

I also provide a construction by which the liquid which passes out through all of the valves is discharged from the tank through a single discharge connection.

My invention further relates to arrangements and combinations of parts which will be hereinafter described and more particularly pointed out in the appended claims.

Preferred forms of the invention are shown in the drawing, in which.

Figure 1:
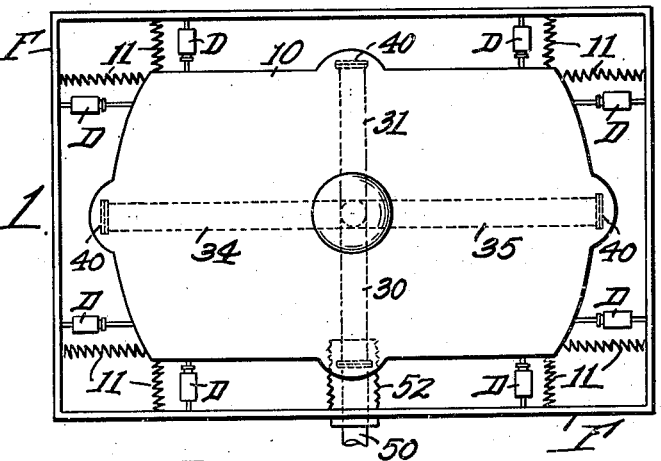
Fig. 1 is a plan view of my improved liquid storage tank.
Figure 5:
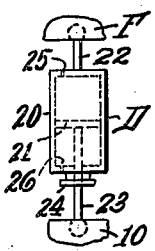
Fig. 5 is a side elevation of a shock-absorbing device.
Figure 2:
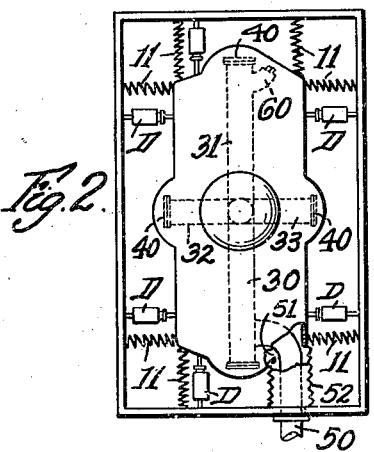
Fig. 2 is an end elevation thereof, looking in the direction of the arrow 2 in Fig. 1.

Referring to Figs. 1 to 6, my improved liquid storage tank comprises a closed casing 10 which may be of any desired shape but which is shown herein as approximately rectangular and as loosely enclosed in a rectangular fixed framework F.

The casing 10 is normally centered in the frame F, both vertically and horizontally, by a plurality of compression springs 11 interposed between the sides, ends and bottom and top surfaces of the casing and the adjacent portions of the fixed frame F. The tank 10 thus has limited yielding movement in every direction relative to the frame F.

Shock-absorbing devices D are preferably associated with the compression springs 11 and prevent too rapid oscillation of the casing in the frame F. These shock-absorbing devices may be of any usual construction, such as is shown for instance in Fig. 5, where the device D comprises a cylindrical casing 20 in which a piston 21 is slidable. The casing 20 is connected by a rod 22 to the frame F and the piston 21 is connected by a piston rod 23 to an adjacent portion of the casing 10. Suitable packing 24 is provided for the piston rod, and small bleed openings 25 and 26 are provided in the ends of the cylinder 20. The rods 22 and 23 preferably have ball-shaped ends to provide swivel connections between the casing 10 and the frame F, so that the casing may be free to move in any direction.

A discharge pipe 30 is provided in the casing 10, which pipe 30 has an upward extension 31 and four horizontal extensions 32, 33, 34 and 35, thus forming a six-armed pipe cross. Each of the six arms is provided at its outer end with valve structure such as is shown in detail in Figs. 3 and 4.

Each valve comprises a plate 40 which is normally seated against the outer end of its branch pipe by a tension spring 41. Each plate 40 has a guide-pin 42 slidable in a tube 43 which is fixed to a perforated plate 44 forming a partition near the end of its branch pipe.

Figures 3, 4:
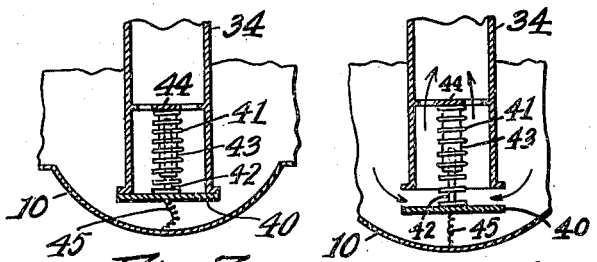
Fig. 3 is a sectional plan view of a discharge valve, shown in closed position.
Fig. 4 is a view similar to Fig. 3 but showing the valve open.

Each plate 40 is connected to an adjacent portion of the casing 10 by a flexible cord or chain 45, which allows the valve to be closed by its spring 41 when the casing 10 is centered in the frame F, but which opens the valve as shown in Fig. 4 when the distance between the end of the branch pipe and the adjacent casing wall is increased by displacement of the casing in the frame-work F.

In order to hold the discharge pipe structure fixed in the frame F while the casing 10 is freely movable in all directions, I provide a discharge connection 50 (Fig. 2) near the lower end of the pipe 30, which connection 50 passes freely through an enlarged opening 51 in the end of the casing 10 and is fixed in the frame F. The opening 51 is sealed by a bellows member 52, inserted between the casing 10 and the frame F and loosely enclosing the connection 50.

With this construction, the discharge connection 50 and the six-armed cross supported thereby is maintained fixed in the frame F, without interfering in any way with the limited free displacement of the casing 10. The casing 10 may thus be yieldingly displaced in any direction by the mass or inertia of liquid in the casing, as the angular position of the tank is varied or as the acceleration of the mass of liquid is increased or decreased. On such displacement one or more of the valves 40 which are at that time submerged in the liquid will be opened by their flexible connections 45, while the valves which are not submerged will be closed by their springs 41.

The casing 10 will occupy the accurately centered position shown in the drawing only when the casing 10 is empty, and there is no mass of liquid therein to displace the casing by its weight or inertia.

It is desirable to exclude air or gas from the discharge pipe structure as the casing 10 is filled and for this purpose I provide the upper pipe extension 31 with an offset inlet 60 (Fig. 6), normally closed by a plug 61. A cover plate 62 is provided for an opening 63 in the casing 10 adjacent the inlet 60.

When the casing 10 is to be filled, the plate 62 and plug 61 are removed, so that liquid may be poured through the opening 63 to fill the casing and may also freely enter the discharge pipe structure through the inlet 60 and the perforations in the adjacent partition 44.

There are no angles in the branch pipes in which air can be trapped and the pipe structure may be filled independently of the filling of the tank if so desired.

In a tank constructed as described, I secure continuous discharge of liquid from the casing 10 through the discharge connection 50 in every angular position of the storage tank and under all conditions of acceleration or deceleration.

In certain cases it may not be desirable to mount the tank casing for free movement in its supporting frame work. Under these circumstances, I may utilize the construction shown in Figs. 7 and 8.

In this modified construction, the casing 100, the discharge pipe structure 101 and the valve structure 102 may be as previously described, except that the casing 100 is fixed in position relative to the discharge pipe structure 101. The flexible connection 103 for the valve 102 is connected to a yoke 104 having end plates 105 and 106. These plates form the movable ends of bellows members 107 and 108 respectively and are normally maintained in the position shown in Fig. 7 by compression springs 110 and flexible stop members 111. The interiors of the bellows members 107 and 108 are vented to the atmosphere through openings 114 in the casing 100.

With this construction, the weight or inertia of the liquid in the casing 100 is exerted on the plates 105 and 106 and will compress the springs 110, thus moving the yoke 104 toward the adjacent portion of the casing 100 and tensioning the connection 103 to open the valve 102.

Figure 7:
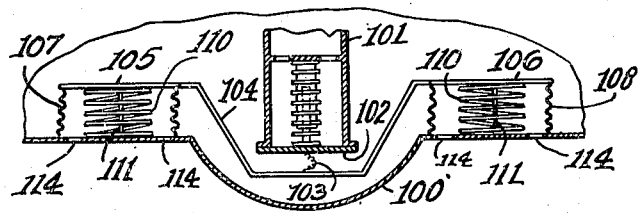
Fig. 7 is a sectional side elevation of a modified tank construction.
Figure 6:
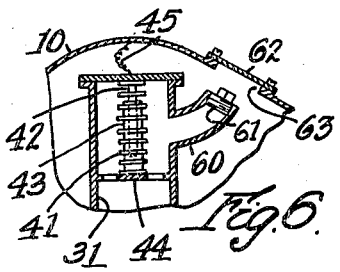
Fig. 6 is a detail sectional elevation of a filler device.
Figure 8:
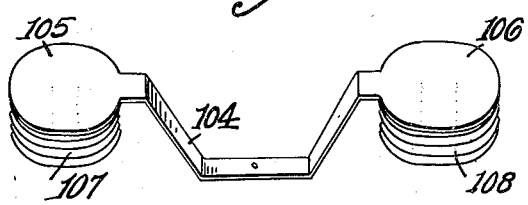
Fig. 8 is a perspective view of certain parts shown in Fig. 7.

By providing outwardly curved recesses in the casings 10 or 100, as shown particularly in Figs. 3 and 7, the ends of the branch discharge pipes may extend beyond the normal surface of the casing walls, so that the liquid may be more completely drained from the casing than would be the case if the valves were located substantially inward from said walls.

From the above description, the use and advantages of my invention will be readily apparent, particularly when the invention is installed in aircraft or similar structure in which the angular position of the tank as well as the acceleration or deceleration of the contents may vary quickly and widely.

Having thus described my invention and the advantages thereof, I do not wish to be limited to the details herein disclosed, otherwise than as set forth in the claims, but what I claim is:

1. A liquid storage tank comprising a movably mounted closed casing, a discharge connection having branch pipes mounted in fixed position within said movable casing and terminating within and adjacent spaced imperforate side, bottom and top inner surfaces of said casing, a separate valve normally closing the outer end of each fixed branch pipe within said movable casing, and means to open each such valve by displacement of said casing due to the pressure of the mass of liquid in said tank exerted adjacent said valve and while said valve is submerged in said liquid.

2. The combination in a storage tank as set forth in claim 1, in which means is provided to fill said discharge connection and said branch pipes when said casing is being filled and as a single operation.

3. A liquid storage tank comprising a closed casing, a discharge connection having branch pipes terminating adjacent spaced side, bottom and top inner surfaces of said casing, a separate valve normally closing the outer end of each branch pipe, and means to open each such valve by the pressure of the mass of liquid in said tank exerted against a surface adjacent said valve and movable relative thereto.

4. A liquid storage tank for a movable structure comprising a frame fixed in said movable structure and displaceable therewith, a closed casing, means to yieldingly support said casing in said frame for controlled displacement therein, a discharge connection fixed in said frame and extending freely into said casing, branch pipes mounted on said discharge connection within said casing, a separate valve normally closing the outer end of each branch pipe, and means to open certain valves in response to changes in the application of the weight or inertia of the liquid in said casing incident to changes in acceleration, deceleration or position of said movable structure.

5. A liquid storage tank for a movable structure comprising a frame fixed in said movable structure and displaceable therewith, a closed casing, means to yieldingly support said casing in said frame for controlled displacement in all directions therein, a discharge connection fixed in said frame and extending freely into said casing, branch pipes mounted on said discharge connection within said casing, a separate valve normally closing the outer end of each branch pipe, and means to open certain valves in response to displacement of said casing in said frame by changes in the application of the weight or inertia of the liquid to said casing incident to changes in acceleration, deceleration or position of said movable structure.

6. A liquid storage tank for a movable structure comprising a frame fixed in said movable structure and displaceable therewith, a closed casing, means to yieldingly support said casing in said frame for controlled displacement in all directions therein, a discharge connection fixed in said frame and extending freely into said casing, bellows sealing means for said casing around said discharge connection, branch pipes mounted on said discharge connection within said casing, a separate valve normally closing the outer end of each branch pipe, and means to open certain valves by application of the weight or inertia of the liquid against said casing adjacent said valve incident to changes in acceleration, deceleration or position of said movable structure.

7. A liquid storage tank for a movable structure comprising a fixed frame fixed in said movable structure and displaceable therewith, a closed casing, means to yieldingly support said casing in said frame for controlled displacement in all directions therein, a discharge connection fixed in said frame and extending freely into said casing, bellows sealing means for said casing around said discharge connection, branch pipes mounted on said discharge connection within said casing, a separate valve normally closing the outer end of each branch pipe, and a connection between the casing and each valve through which said valve is opened by outward displacement of the casing relative to the branch pipe by application of the weight or inertia of the liquid against said casing adjacent said valve incident to changes in acceleration, deceleration or position of said movable structure.

8. A liquid storage tank for a movable structure comprising a frame fixed in said movable structure and displaceable therewith, a closed casing, means to yieldingly support said casing in said frame for controlled displacement therein, a discharge connection fixed in said frame and extending freely into but sealed in said casing, branch pipes mounted on said discharge connection within said casing and extending in different directions therefrom, a normally closed valve for the outer end of each branch pipe, and means to open the valves on different branch pipes as said tank, when containing liquid, is displaced to different angular positions with respect to the vertical incident to changes in position of said movable structure.

9. A liquid storage tank for a movable structure comprising a frame fixed in said movable structure and displaceable therewith, a closed casing, means to yieldingly support said casing in said frame for controlled displacement therein, a discharge connection fixed in said frame and extending freely into but sealed in said casing, branch pipes mounted on said discharge connection within said casing and extending in different directions therefrom, a normally closed valve for the outer end of each branch pipe, and means to open one of said valves as the tank, when containing liquid, is accelerated and a different valve as the tank is decelerated incident to changes in acceleration or deceleration of said movable structure.

10. A liquid storage tank for a movable structure comprising a frame fixed in said movable structure and displaceable therewith, a closed casing, means to support said casing in said frame for yielding displacement therein, damping devices controlling the rate of displacement, a discharge connection fixed in said frame and extending freely into said casing, sealing means for said casing around said connection, branch pipes mounted on said discharge connection within said casing, and terminating adjacent different spaced portions of said casing, a normally closed valve for the outer end of each branch pipe, and means to open certain discharge valves on different branch pipes as said tank, when containing liquid, is displaced relative to said fixed frame by the weight or inertia of the liquid therein incident to changes in acceleration, deceleration or position of said movable structure.

11. A liquid storage tank for a movable structure comprising a frame fixed in said movable structure and displaceable therewith, a closed casing, means to yieldingly support said casing in said frame for controlled displacement therein, a discharge connection fixed in said frame and extending freely into said casing, branch pipes mounted on said discharge connection within said casing and terminating adjacent different spaced portions of said casing, a valve for the outer end of each branch pipe, and means to open certain discharge valves as the tank, when containing liquid, is tilted, accelerated or decelerated incident to changes in acceleration, deceleration or position of said movable structure.

12. A liquid supply tank for a movable structure comprising a casing mounted in said structure, a discharge pipe fixed relative to said movable structure, fixed branch discharge pipes within said casing and extending in diverse directions from said discharge pipe to spaced points inside of and adjacent the casing wall, a normally closed valve for each branch pipe, separate means to open each of said valves, said separate means being rendered operative by the weight or the inertia of the liquid in said tank when exerted adjacent thereto and incident to changes in acceleration, deceleration or position of said movable structure, and means to close said valves as soon as said weight or inertia becomes non-effective.

13. A liquid storage tank for a movable structure comprising a frame fixed in said movable structure and displaceable therewith, a closed casing, means to yieldingly support said casing in said frame for controlled displacement therein, a discharge connection fixed in said frame and extending freely into said casing, branch pipes mounted on said discharge connection within said casing and terminating adjacent different spaced portions of said casing, said spaced adjacent portions being outwardly displaced relative to the casing surfaces and the branch pipes terminating substantially in the planes of said casing surfaces, a valve for the outer end of each branch pipe, and means to open certain discharge valves as the tank, when containing liquid, is tilted, accelerated or decelerated incident to changes in acceleration, deceleration or position of said movable structure.

14. A liquid supply tank comprising a fixed casing, a branched discharge pipe fixed in said casing, a normally closed valve for each branch pipe, and separate means to open each of said valves, said separate means being operated by the weight or the inertia of the liquid in said tank exerted adjacent thereto, and said separate means comprising bellows members having their interiors vented to atmosphere, springs to expand said bellows members, means to limit such expansion, and a non-extensible connection from said bellows members to said valve through which said valve is opened as said members are compressed by liquid pressure thereon.

15. A liquid storage tank comprising a closed casing, a discharge connection having branch pipes terminating adjacent spaced side, bottom and top inner surfaces of said casing and entering said discharge connection at angles which will avoid the trapping of air in said branch pipes, a separate valve normally closing the outer end of each branch pipe, means to open each such valve by the pressure of the mass of liquid in said tank exerted against a yieldingly mounted surface adjacent said valve, and the branch pipe extending adjacent the top inner surface of the casing having a removable closure at its outer end adjacent a removable closure in said casing and through which the entire discharge pipe structure may be independently filled without the trapping of air therein.

ROBERT H. GODDARD.